Aug. 17, 1926.
W. H. CHAPMAN
1,596,335
CIRCUIT CLOSER FOR AUTOMOBILE CURVE LIGHTS
Filed Oct. 3, 1925
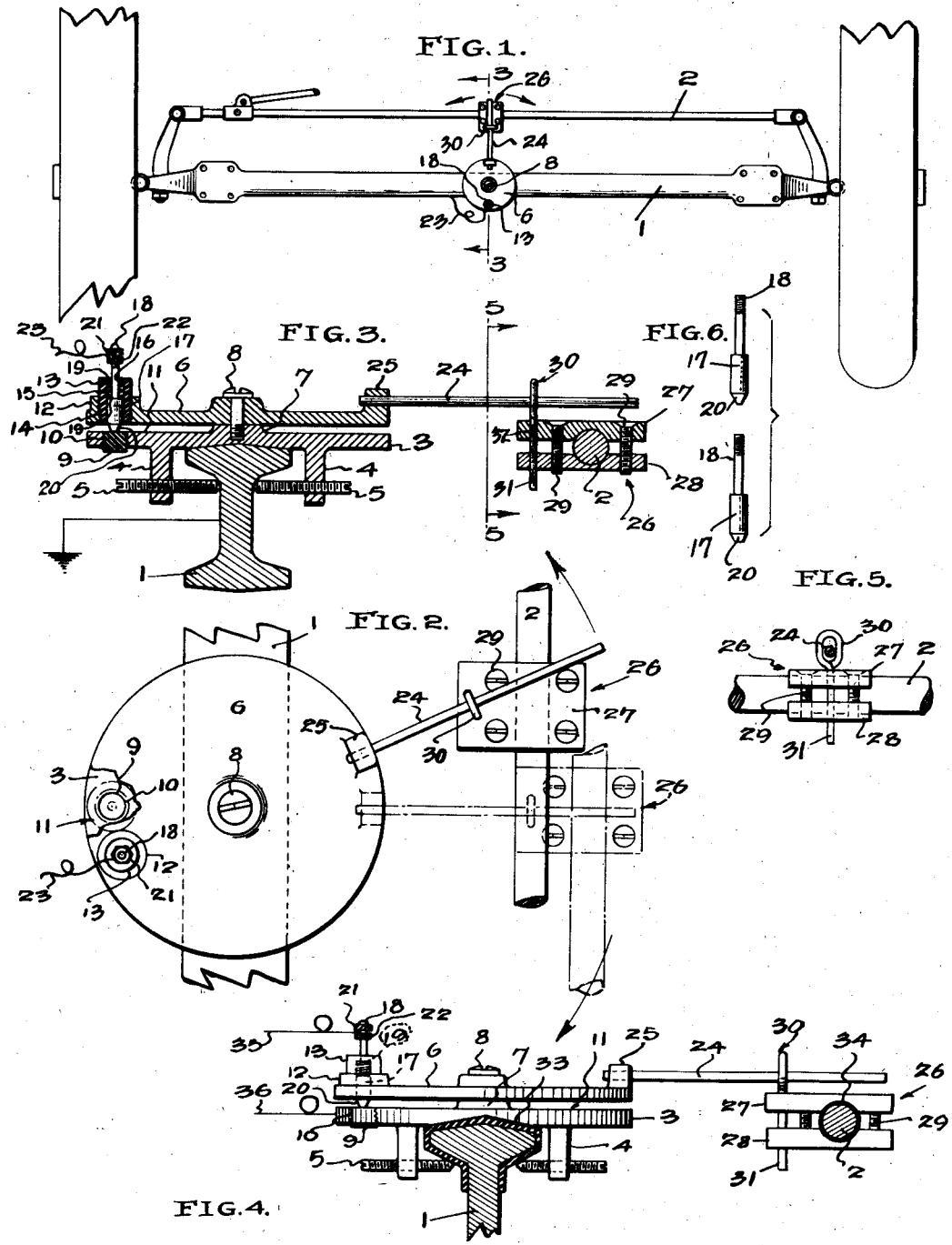
INVENTOR
WILLIAM H. CHAPMAN
BY
ATTORNEY Patented Aug. 17, 1926.

1,596,335

UNITED STATES PATENT OFFICE.

WILLIAM H. CHAPMAN, OF OAKLAND, CALIFORNIA.

CIRCUIT CLOSER FOR AUTOMOBILE CURVE LIGHTS.

Application filed October 3, 1925. Serial No. 60,334.

The present invention relates to make-and-break switches for automobile auxiliary lighting systems, whose operations are controlled through the steering-gear mechanism, and more particularly to those whose action is directly dependent upon the movements of the tie-rod thereof, and has for its most important object the provision of a simple, positive and dependable means governable through the movement of the tie-rod for the control of those auxiliary lighting systems adapted for directing light upon road curves at the instant of necessitated changes in direction of course, as well as in such other directions of application as will best insure against danger and injury.

A further object of the present invention is the provision of a simple means for the automatic control of an automobile's auxiliary lighting system through the movement of its tie-rod, thereby relieving its driver of the divided attention necessitated by a manually controlled system.

An additional object of the invention is to provide a switch operable through the tie-rod of a steering-gear mechanism and adapted to break the current while on a straight-ahead drive and to make the current while turning to either the right or left.

The invention, as here presented, is of the preferred combination and arrangement of parts and the one best adapted for reliable and efficient operation in the direction designated.

In the accompanying drawings, forming a part of this specification and in which similar characters of reference refer to like parts, throughout:—

Figure 1 is a plan view of the front axle of an automobile, showing the position of the switch and the universal character of its connection to the tie-rod of the steering mechanism, as it appears when in neutral position;

Figure 2 is an enlarged top plan view of the switch, showing in connection therewith the universal clamp-member, the dot-and-dash lines indicating the position of the tie-rod and universal clamp-member when in neutral position, and the full line the position of these elements when the vehicle's steering mechanism has been actuated for a left turn, this movement operating to simultaneously and automatically close the auxiliary light circuit;

Figure 3 is a sectional detail of the switch proper, showing the method of clamping it to the front axle and its universal actuating connection to the tie-rod of the steering mechanism, the section being taken on the line 3—3 of Figure 1;

Figure 4 is an edge view, showing the switch and its universal connection to the tie-rod, as illustrated in Figures 1, 2 and 3, except that the bottom plate of the switch proper is insulated from the axle and the tie-rod clamp insulated from the tie-rod, this form being slightly modified to utilize a one wire, lamp or circuit, the lamp itself being grounded by its connections with the car, while the other form utilizes a two wire lamp, or circuit, the ground wire being carried to the head of contact point in top plate of switch;

Figure 5 is a detail view of the tie-rod clamp-member and swivel-member adapted to actuate the switch and to compensate for the ever changing distance between tie-rod and axle when the tie-rod is moved laterally through the action of the steering-gear, the view being taken on the line 5—5 of Figure 3; and Figure 6 is a view showing different forms of contact-pins, with their varying degrees of area of contact, the variation in these areas being dependent upon the required time of contact of the pin upon the neutral zone, this zone being comprised of any suitable insulating material.

Referring with greater particularity to the drawings, 1 represents the front axle of the usual automobile construction, having the ordinary tie-rod 2 connecting the steering knuckles and forming a part of the steering mechanism (not shown).

The switch proper is comprised of a circular metal disc 3 secured, approximately, centrally of the axle 1 by means of depending ears 4 and set-screws 5 and clamped tightly in place in a horizontal position. A second metal disc 6 of a diameter like to that of disc 3 is spaced slightly above the first disc by means of a boss 7 and revolubly secured thereto by a central screw 8 tapped into the boss. The bottom disc 3 is provided adjacent its outer edge with a "neutral-zone" plug 9, comprised of any suitable insulating material, tapped into said disc, as indicated at 10, with its upper face flush with the upper face 11 of the disc. The upper disc 6 is provided with a boss 12 eccentrically positioned relative to the screw 8 and adapted to describe an arcuate course directly above the plug 9 of the disc 3, said boss being provided with a screw-threaded housing 13 adapted to be screwed into the threaded opening 14 formed in the boss for its reception, said housing being constructed, preferably, of "bakelite", or similar insulating material, and having a central open-ended bore 15 and counter bore 16 adapted to house a contact-pin 17, the open end of the bore 15 allowing the contact-pin to project beyond the underside surface of the disc 6 and into frictional contact with the upper face of the bottom disc 3. The contact-pin is provided with a reduced upper end 18 forming a shoulder which is adapted to maintain a coiled spring 19, under compression, in the upper end of the bore 15 of the housing, said spring tending to urge the point 20 of the pin 17 against the disc 3, to, at all times, make a contact with said disc, except when the disc 6 is moved to neutral position with the pin resting upon the insulating plug 9. The upper end of the contact-pin is provided with knurled nuts 21 and 22, to which one of the terminals is attached, as at 23, the other, ordinarily, being grounded through the frame. The upper disc 6 is actuated, through the lateral movement of the tie-rod 2, by means of a rigidly connected projecting rod 24 which is secured in the boss 25 formed at the outer edge thereof and positioned diametrically opposite the boss 12. This rod is swung in an arcuate course by means of a clamp-member 26 comprised of two clamp-plates 27 and 28 rigidly clamped to the tie-rod 2 by means of screws, or bolts, 29. An eye-bolt 30, having a shank 31, is inserted through openings 32 formed in the ends of the plates 27 and 28 and projects above the upper plate 27 and is adapted to receive the free end of the rod 24, with its shank free to rotate in the openings 32 to compensate for the changing position of the tie-rod relative to the axle, as indicated in Figure 2. This swivel connection allows free movement of the parts relative to each other and adapts the device for ready adjustment to practically any make of automobile and further provides a positive means for the actuation of the disc 6 relative to the disc 3, through either right or left movements of the steering-gear.

In Figure 4, I have shown the same switch mechanism, except that in this instance it is insulated from the axle by insulating material 33 and the clamp-member insulated from the tie-rod by a tube of insulating material 34. In this arrangement the auxiliary light-circuit terminals 35 and 36 are connected, respectively, to the contact-pin 17 and the disc 3.

The contact-pin point 20 may be varied, as to area, relative to the area of the plug 9, to compensate for variations in the movements of the steering-gear while steering in a straight course, and to provide a means whereby positive closing of the circuit of either the right or left auxiliary light may be secured upon slightest movement of the steering-wheel in beginning a turning movement in either direction.

This device is especially adaptable for use in automobiles having auxiliary lighting systems, as it is readily connectible into the circuit and provides automatic means for making and breaking the circuit, to light both lights at the instant of beginning a turning movement, or to extinguish both lights at the instant of entering upon a straight course, the circuit remaining broken while the straight course is being pursued and immediately made upon a departure in either direction from this course.

Having thus described my invention, I claim, and desire to secure by Letters Patent:—

1. In a device of the character described, the combination, with the tie-rod and front axle of an automobile, of a switch comprising a pair of metal discs, one of which is provided with a clamp-member adapted for its rigid securement to said front axle and the other pivotally secured to said rigidly secured disc and adapted for revoluble movement relative thereto, a projecting rod borne by said pivotally secured disc, a spring-actuated contact member borne by said revoluble disc and constituted of a shouldered pin bearing a compression spring, an insulated member borne by said revoluble disc and insulating said pin from said disc, an insulated neutral-zone member carried by said rigidly secured disc and positioned in the arc of travel of said contact member, and swivel means, in the form of a clamp and rotatable eye-bolt, connecting said revoluble disc through the medium of said rod to said tie-rod and adapted for co-operative action therewith.

2. In a device of the character described, the combination of a movable element and a stationary element, such as the tie-rod and front axle, respectively, of an automobile, a clamp-member bearing a swivel connected to said tie-rod, a switch comprising a pair of metal discs, one of which is superimposed upon the other, the lower disc being provided with a clamping member adapted for its securement rigidly to said front axle, with the upper disc revolubly secured to said lower disc and adapted for revoluble movement relative thereto, a spring-actuated contact member borne by said upper disc consisting of a shouldered pin bearing a compression spring, an insulated housing carried by said revoluble disc and forming a bearing for said pin, said pin being adapted to frictionally engage said lower disc, an insulated neutral-zone member fixedly borne by said lower disc and so disposed as to lie in the path of the arcuate sweep of said contact member while said contact member is maintained in the neutral position, and a projecting rod borne by said upper disc adapted to engage said clamp-member swivel carried by said tie-rod, to impart a selective rotary movement to said upper disc.

In testimony whereof I have affixed my signature.

WILLIAM H. CHAPMAN.